United States Patent

Payne et al.

(10) Patent No.: US 8,256,311 B2
(45) Date of Patent: Sep. 4, 2012

(54) AIRCRAFT DOOR ACTUATOR MOUNTING ASSEMBLY

(75) Inventors: David A. Payne, Phoenix, AZ (US); Jim Kern, Chandler, AZ (US); Stephen Birn, Long Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 804 days.

(21) Appl. No.: 12/355,347

(22) Filed: Jan. 16, 2009

(65) Prior Publication Data

US 2010/0180432 A1 Jul. 22, 2010

(51) Int. Cl.
*F16H 25/08* (2006.01)

(52) U.S. Cl. ..................... 74/89.37; 74/89.23

(58) Field of Classification Search .............. 74/89.37, 74/89.23; 244/129.5
See application file for complete search history.

(56) References Cited

U.S. PATENT DOCUMENTS

| | | | | |
|---|---|---|---|---|
| 3,161,074 A | * | 12/1964 | Korthaus et al. | 74/89.34 |
| 3,682,283 A | * | 8/1972 | Sato | 192/141 |
| 4,498,648 A | | 2/1985 | DeLuca et al. | |
| 5,041,748 A | * | 8/1991 | Huber | 310/80 |
| 6,334,276 B1 | | 1/2002 | Marin-Martinod et al. | |
| 2003/0192987 A1 | | 10/2003 | Ahrendt et al. | |
| 2007/0025838 A1 | | 2/2007 | Stelzer | |

* cited by examiner

*Primary Examiner* — Troy Chambers
*Assistant Examiner* — Terence Boes
(74) *Attorney, Agent, or Firm* — Ingrassia Fisher & Lorenz, P.C.

(57) ABSTRACT

An actuator mounting assembly includes a cap, a rod, a spring mechanism, and a switch assembly. The cap is adapted to couple to an actuator. The rod extends through the cap and includes a first end adapted to extend through the actuator and a second end adapted to attach to a fixed location. The spring mechanism is disposed in the cap cavity, is compressible, and has a predetermined preload. The switch assembly is disposed in the cap and adapted to sense relative positioning between the rod and the cap and to provide signals based on the sensed relative positioning. When the rod and the cap are in a first relative position, the switch assembly provides a first signal to the actuator to allow the cap to move axially relative to the rod, but when in a second relative position, the switch assembly discontinues providing the first signal to the actuator.

10 Claims, 5 Drawing Sheets

AIRCRAFT DOOR ACTUATOR MOUNTING ASSEMBLY

TECHNICAL FIELD

The inventive subject matter generally relates to actuators, and more particularly relates to mounting assemblies and methods of adjusting actuators.

BACKGROUND

Aircraft doors, such as auxiliary power unit doors, are typically installed onto aircraft using numerous rigging components. For example, connecting hardware including actuators, links, extension rods, and the like may be used to couple one end of the door to a fixed location and to allow at least another end of the door to pivot around the fixed location. Additionally, positioning sensors and other switching devices may be included on the aircraft door and around an opening over which the door is to cover, and the sensors and/or switching devices may be employed to indicate positioning of the door relative to the opening.

Although conventional rigging components securely mount the doors to the aircraft, the connecting hardware used for the rigging components and processes for installing the rigging components may be improved. For example, installation and/or repair processes are generally subjected to time constraints. However, because the rigging components may include numerous pieces, the processes may include various steps to ensure appropriate positioning of the door relative to the aircraft. The steps may include precisely aligning and/or calibrating the positioning sensors, precisely aligning and/or calibrating the switching devices, and/or replacing or adjusting the actuators, links, rods or other components, each of which may undesirably increase aircraft downtime. Moreover, as each aircraft model may have a particular design specification, the rigging components for one aircraft model may not be suitable for use with another aircraft model. Hence, obtaining and/or designing the specific rigging components or rigging procedures for each aircraft model may increase maintenance and/or aircraft manufacturing costs.

Accordingly, it is desirable to improve the manner by which a door, or other component to be actuated, is installed in an aircraft. In particular, it would be desirable to have an actuator mounting assembly that has fewer rigging components and that is simpler to install than conventional actuator mounting assemblies. In addition, it is desirable to have an actuator mounting assembly that may be implemented into more than one aircraft model. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Actuator mounting assemblies, actuator assemblies, and methods of adjusting actuators are provided.

In an embodiment, by way of example only, an actuator mounting assembly includes a cap, a rod, a spring mechanism, and a switch assembly. The cap includes a sidewall, an endwall, and an opening, the sidewall has an end adapted to couple to an actuator where the sidewall and the endwall define a cavity, and the opening is formed through the endwall. The rod extends through the cap and includes a first end and a second end, the first end is adapted to extend through a portion of the actuator, and the second end is adapted to attach to a fixed location. The spring mechanism is disposed in the cavity of the cap and is compressible between the actuator and the cap and has a predetermined preload. The switch assembly is disposed in the cap. The switch assembly is adapted to sense relative positioning between the rod and the cap and to provide signals, based, in part, on the sensed relative positioning between the rod and the cap. When the rod and the cap are in a first relative position with respect to each other, the switch assembly provides a first signal to the actuator to allow the cap to move axially relative to the rod. When the rod and the cap are in a second relative position respect to each other, the switch assembly discontinues providing the first signal to the actuator.

In another embodiment, by way of example only, an actuator assembly includes an actuator, a controller, and an actuator mounting assembly. The actuator includes a housing having an end and an aperture formed through the end, and a lengthening mechanism extending through the housing, the lengthening mechanism configured to extend or shorten. The controller is in communication with the actuator and adapted to provide commands to the actuator to extend or to shorten the lengthening mechanism. The actuator mounting assembly is coupled to the actuator and includes a cap, a rod, a spring mechanism, and a switch assembly. The cap includes a sidewall, an endwall, and an opening. The sidewall is coupled to the end of the housing, the sidewall and the endwall define a cavity, and the opening is formed through the endwall. The rod extends through the cap and includes a first end and a second end, where the first end is adapted to slidably move through the aperture in the housing, and the second end is adapted to attach to a fixed location. The spring mechanism is disposed between the housing and the cap and has a predetermined preload. The switch assembly is disposed between the housing and the cap. The switch assembly is adapted to sense relative positioning between the rod and the cap and to provide a first signal and a second signal to the controller, based, in part, on the sensed relative positioning between the rod and the cap. When the switch assembly senses that the rod and the cap are in a first relative position with respect to each other in which the axial load is less than the predetermined preload of the spring mechanism, the switch assembly provides the first signal to the controller, and the controller provides a first command to the actuator to allow the lengthening mechanism to extend to thereby allow the cap to move axially relative to the rod. When the switch assembly senses that the rod and the cap are in a second relative position with respect to each other in which the axial load is greater than the predetermined preload of the spring mechanism, the switch assembly provides the second signal to the controller, and the controller provides a second command to the actuator to discontinue extension of the lengthening mechanism to prevent the cap from moving axially relative to the rod.

In another embodiment, by way of example only, a method of adjusting an actuator includes compressing a spring mechanism having a predetermined preload to move a cap relative to a rod, when an axial load against the spring mechanism exceeds the predetermined preload of the spring mechanism, wherein the cap, the rod, and the spring mechanism comprise an actuator mounting assembly that is coupled to an actuator, the cap includes a sidewall, an endwall, and an opening, the sidewall is coupled to the end of the housing, the sidewall and the endwall defines a cavity, and the opening is formed through the endwall, the rod extends through the cap and including a first end and a second end, the first end of the rod is adapted to slidably move through the aperture in the housing, and the second end is adapted to attach to a fixed location, and the spring mechanism is disposed between the housing and the cap. The method also includes providing a signal from a component adapted to sense relative positioning between the cap and the rod to indicate movement between the cap and the rod, when the cap and the rod move from a first relative position to a second relative position.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Additionally, although the inventive subject matter is described as being employed with a door of an aircraft, it will be appreciated that the inventive subject matter may be incorporated into any type of vehicle and/or assembly that may be moved between various positions using an actuator, including but not limited to, valve assemblies, gear, panels, control surfaces, and the like. Moreover, the inventive subject matter may be implemented into a landcraft, watercraft, spacecraft, or other type of vehicle. Furthermore, there is no intention to be bound by any theory presented in the preceding background or the following detailed description.

Figure 1:
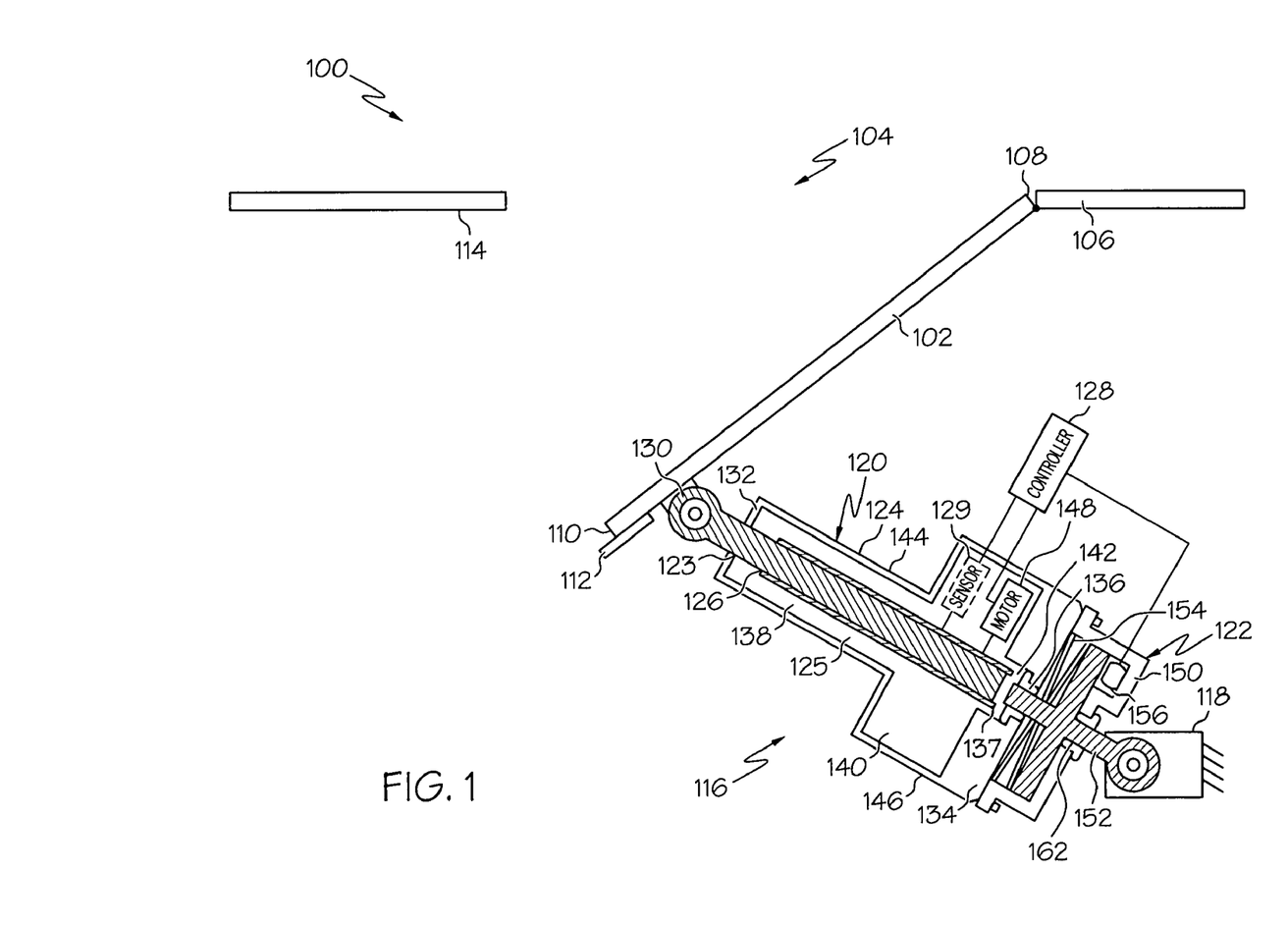
FIG. 1 is a simplified, cross-sectional view of a portion of an aircraft including an actuator mounting assembly and a door in a first position, according to an embodiment.
Figure 4:
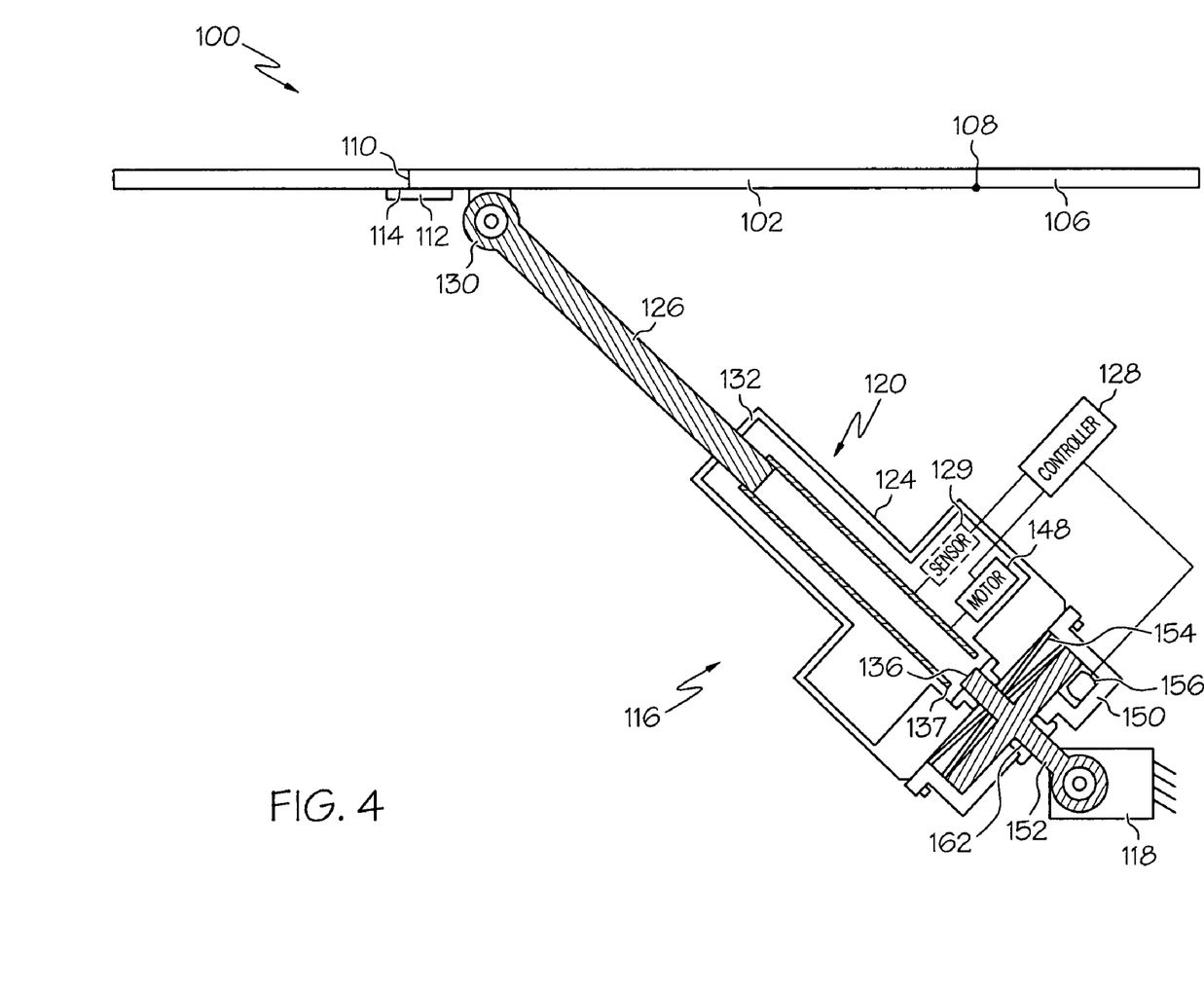
FIG. 4 is a simplified, cross-sectional view of the portion of the aircraft including the actuator mounting assembly and the door in a second position, according to an embodiment.
Figure 5:
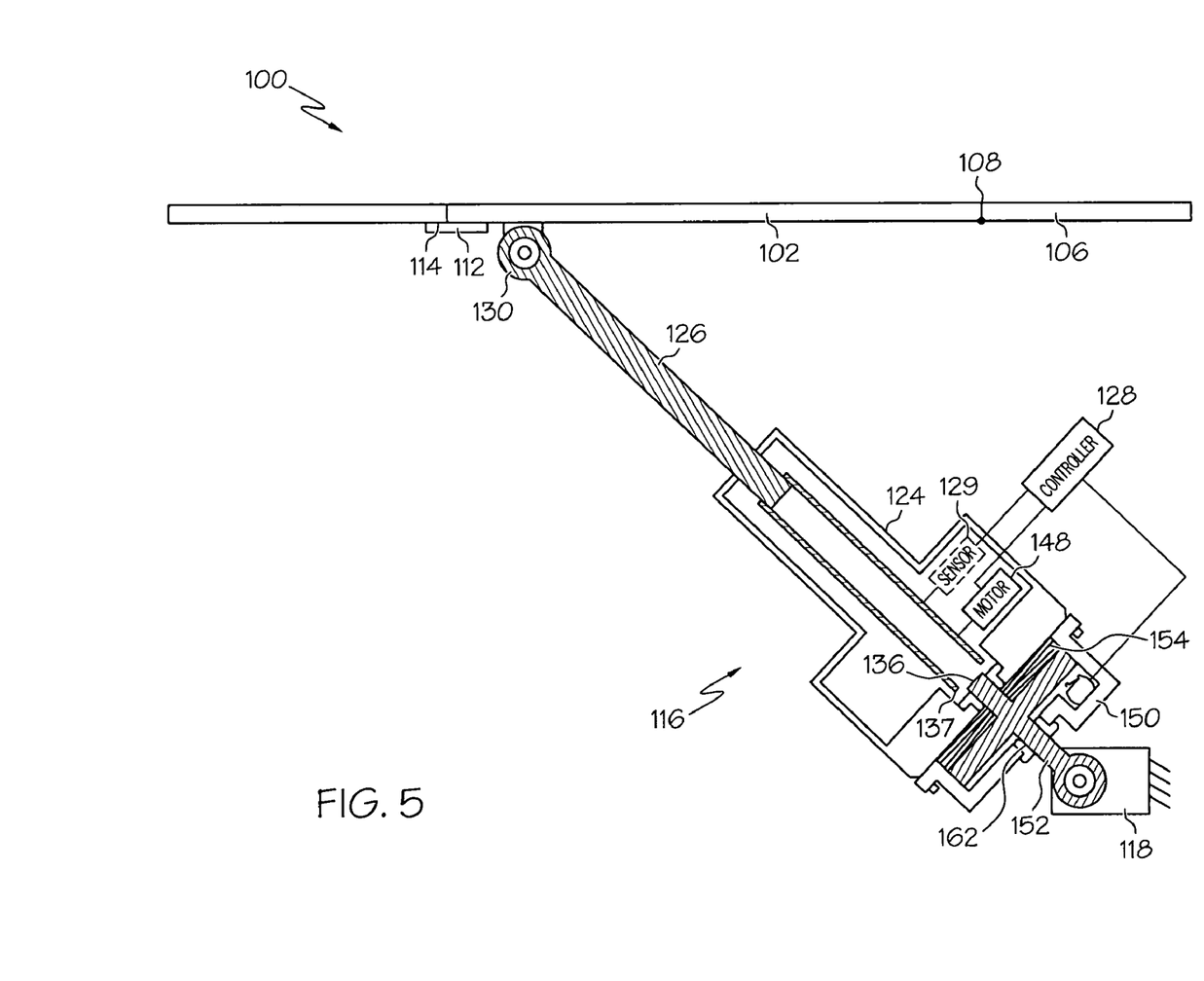
FIG. 5 is a simplified, cross-sectional view of the portion of the aircraft including the actuator mounting assembly and the door in a second position, according to an embodiment.

FIG. 1 is a simplified, cross-sectional view of a portion of an aircraft 100, according to an embodiment. The aircraft 100 includes a door 102 adapted to cover an opening 104 formed in an aircraft wall 106, in an embodiment. The door 102 may have a first edge 108 that is rotatably attached to the aircraft wall 106 so that a second edge 110 of the door 102 may be pivoted away from and towards the aircraft wall 106. According to an embodiment, the door 102 may be positioned in a "first" or "open" position (as shown in FIG. 1) to allow access or airflow into the opening 104. To prevent over-extension of the door 102, a stop 112 may be included on the door 102. For example, the stop 112 may extend away from the second edge 110 of the door 102 and may be adapted to contact a surface 114 of the aircraft wall 106 when the door 102 is moved into a "second" or "closed" position (as shown in FIGS. 4 and 5) to prevent access to or airflow into the opening 104. In an embodiment, the stop 112 may or may not be integrally formed as part of the door 102, and for instance, may be an extended portion of the door 102. Although the stop 112 is illustrated as extending from the door 102, the stop 112 alternatively may extend from the aircraft wall 106 as an integrally formed component with the aircraft wall 106 or a separately formed component in other embodiments.

To ensure that the edges 108, 110 of the door 102 are appropriately aligned with the aircraft wall 106 when the door 102 is in the second or "closed" position, an actuator assembly 116 is mounted between the door 102 and a fixed location 118. The fixed location 118 may be located in an interior of the aircraft 100, in an embodiment. In another embodiment, the fixed location 118 may be located at an exterior of the aircraft 100. The actuator assembly 116 may include an actuator 120 and an actuator mounting assembly 122, in an embodiment. The actuator 120 is adapted to be attached to the door 102 and to move the door 102 between various positions. In an embodiment, the actuator 120 includes a housing 124 and a lengthening mechanism 126. The housing 124 may be configured to accommodate at least a portion of the lengthening mechanism 126 and to allow at least a first end 130 of the lengthening mechanism 126 to extend outside of the housing 124 and to attach to the door 102. In this regard, the housing 124 may be generally tube-shaped and has a first end 132, a second end 134, and an enclosure 125. In an embodiment, the housing 124 may have an axial length (e.g., measured from the first end 132 of the housing 124 to the second end 134 of the housing 124) in a range of from about 20 cm (centimeters) to about 30 cm. In another embodiment, the housing 124 may have a longer or shorter axial length.

The first end 132 of the housing 124 includes a first aperture 123 that is adapted to receive the lengthening mechanism 126. In an embodiment, the first aperture 123 may have a diameter that is dimensioned such that the lengthening mechanism 126 may slidably move through the first aperture 123. In accordance with an embodiment, the diameter of the first aperture 123 may be in a range of from about 2 cm to about 3 cm. In other embodiments, the diameter of the first aperture 123 may be greater or less than the aforementioned range. Although not shown, a boss may be secured within the first aperture 123 to guide the lengthening mechanism 126, in some embodiments.

The second end 134 of the housing 124 includes a second aperture 136, in an embodiment. According to an embodiment, the second aperture 136 is configured to allow a portion of the actuator mounting assembly 122 to slidably move through, as will be discussed in further detail below. In accordance with an embodiment, the diameter of the second aperture 136 may be in a range of from about 1 cm to about 3 cm. In other embodiments, the diameter of the second aperture 136 may be greater or less than the aforementioned range.

The enclosure 125 may include subsections (e.g., subsections 138, 140, and 142 as shown in FIG. 1), and each subsection may have different diameters and configurations. For example, the first subsection 138 may have a diameter in a range of from about 1 cm to about 3 cm, the second subsection 140 may have a diameter in a range of from about 4 cm to about 12 cm, and the third subsection 142 may have a diameter in a range of from about 1 cm to about 3 cm. In other embodiments, the diameters may be greater or less than the aforementioned ranges. Moreover, in other embodiments, although the diameter of the second subsection 140 is shown as being larger than those of the first and third subsections 138, 142, the diameters may be different relative to each other, in other embodiments. In particular, the specific diameters of each subsection 138, 140, 142 may depend on the dimensions of the components disposed in the enclosure 125. Additionally, although the housing 124 is shown as including a first axial section 144 having an outer diameter that is less than that of a second axial section 146 of the housing 124, the housing 124 may have a substantially uniform outer diameter along its entire axial length, in another embodiment, or the first axial section 144 may have an outer diameter that is greater than that of the second axial section 146 of the housing 124 in still other embodiments.

As noted above, the lengthening mechanism 126 has a first end 130 that is attached to the door 102. In this regard, the first end 130 may be bolted, pinned, or otherwise rotationally attached to the door 102 such that the lengthening mechanism 126 is capable of rotating relative to the door 102, if the door 102 pivots around its first edge 108. In an embodiment, the lengthening mechanism 126 has a second end 137 that resides in the enclosure 125 and which may or may not be secured in position relatively to the housing 124. Although not shown, the second end 137 may be mounted to the housing via conventional mounting assemblies or may be maintained in position by surrounding components within the enclosure 125. In any case, the lengthening mechanism 126 may be configured to extend or to shorten. In this regard, the lengthening mechanism 126 may be a piston or a screw-type device, (for example a ball-screw, acme screw, or simple thread), a device capable of telescoping, such as a plurality of concentric rods, or another type of device capable of transitioning between at least two length configurations. In an embodiment, the lengthening mechanism 126 may be capable of having a shortened configuration having a length in a range of from about 15 cm to about 20 cm and an extended configuration having a length in a range of from about 30 cm to about 40 cm. In other embodiments, the lengths may be greater than or less than the aforementioned ranges. In still other embodiments, the lengthening mechanism 126 may be capable of extending or shortening to length configurations between the shortened configuration length and the extended configuration length of the lengthening mechanism 126.

To transition the lengthening mechanism 126 between the various lengths, the lengthening mechanism 126 may be coupled to an actuator drive motor 148 that is adapted to receive commands from a controller 128 to thereby cause the lengthening mechanism 126 to extend or to shorten. In an embodiment, the actuator drive motor 148 may be disposed in the housing 124. In another embodiment, the actuator drive motor 148 may be disposed remotely from the actuator 120. In either case, the actuator drive motor 148 may be a direct current (DC) or alternating current (AC) electric, pneumatic, or hydraulic-type motor and is adapted to actuate the lengthening mechanism 126 upon receipt of appropriate commands from the controller 128. In an embodiment, the controller 128 may be included in the housing 124 with the actuator drive motor 148 or may be disposed remotely from the actuator drive motor 148. In another embodiment, the controller 128 may provide electrical signals to the actuator 120 via wired or via wireless means. In this regard, the controller 128 may be a micro-computer, or another type of computer device.

In still other embodiments, the lengthening mechanism 126 and the controller 128 may be in communication with a position sensing device 129. For example, the device 129 may be a position sensor or a simple switch (shown in phantom) that is adapted to sense the positioning of the lengthening mechanism 126 (i.e., whether the lengthening mechanism 126 is in a shortened or lengthened configuration), and in response, may send signals to the controller 128 indicating the configuration of the lengthening mechanism 126. In response to the received information from device 129, the controller 128 may command the actuator drive motor 148 to stop at a desired position. The position sensing device 129 may be capable of providing signals to the controller 128 either via wired or via wireless means.

Figure 2:
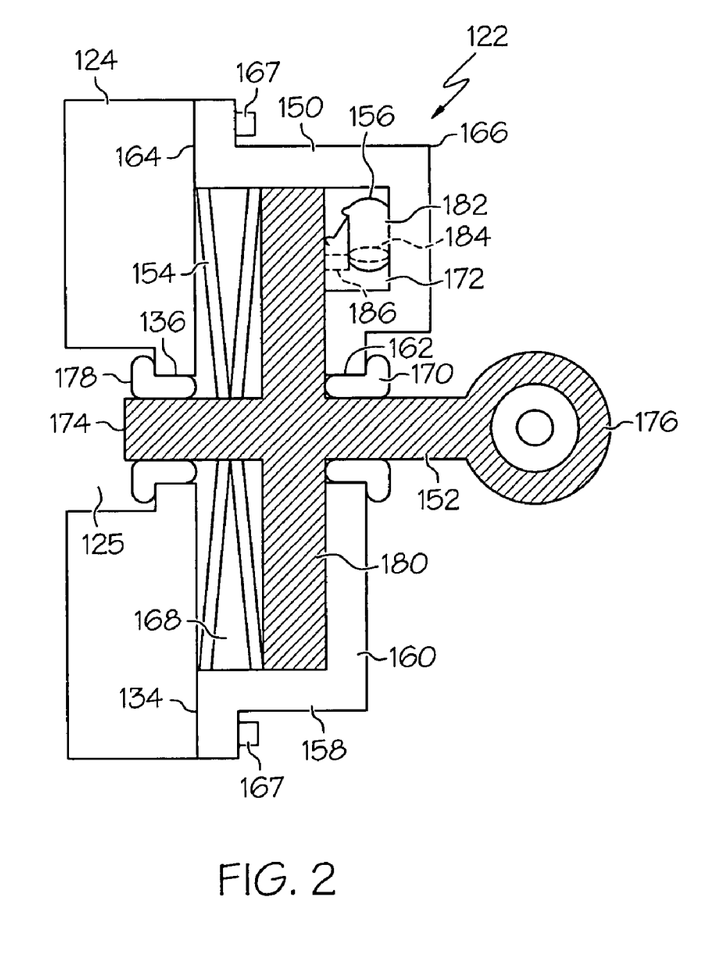
FIG. 2 is a close-up view of the actuator mounting assembly and the portion of the actuator shown in FIG. 1, according to an embodiment.

The actuator mounting assembly 122 is attached to the housing 124 and is configured to maintain the door 102 in the second, closed position and to provide a signal to the controller 128 that the lengthening mechanism 126 has been extended to a desired length configuration. In this regard, the actuator mounting assembly 122 includes a cap 150, a rod 152, a spring mechanism 154, and a switch assembly 156, in an embodiment. FIG. 2 is a close-up view of the actuator mounting assembly 122 shown in FIG. 1 according to an embodiment. In an embodiment, the cap 150 is adapted to accommodate at least a portion of the rod 152, the spring mechanism 154, and the switch assembly 156, and may comprise a material that is capable of maintaining structural integrity when subjected to temperatures in a range of from about −65° C. to about +200° C. For example, the cap 150 may comprise a metal or alloy or a composite, including, but not limited to stainless steel, aluminum, or carbon fiber composite.

In accordance with an embodiment, the cap 150 includes a sidewall 158, an endwall 160, and an opening 162. The sidewall 158 may be cylindrical in shape, although the sidewall 158 may have other shapes as well. The sidewall 158 may have a first end 164 adapted to couple to the housing 124 and a second end 166 over which the endwall 160 is disposed. The first end 164 may be fixedly attached to the housing 124 via one or more fasteners 167, which may be one or more bolts, screws, and the like. The sidewall 158 may have an axial length (measured from the first end 164 of the sidewall 158 to the second end 166) in a range of from about 1.5 cm to about 3.0 cm and an outer diameter in a range of from about 2.5 cm to about 8.0 cm, in an embodiment. In other embodiments, the axial length and/or the outer diameter may be greater or less than the aforementioned ranges. In an embodiment, the sidewall 158 may have an outer diameter that is substantially equal to the outer diameter of the housing 124; however, in other embodiments, the outer diameter of the sidewall 158 may be less or greater than that of the housing 124.

The endwall 160 and the sidewall 158 define a cavity 168. In an embodiment, the cavity 168 may have a diameter in a range of from about 2.5 cm to about 8.0 cm and an axial length in a range of from about 0.5 cm to about 2.0 cm. In some embodiments, the cavity 168 may have an axial length that is substantially equal to or less than the axial length of the sidewall 158. In other embodiments, the cavity 168 may have a larger or smaller diameter and/or axial length than the aforementioned ranges, and one or both of the dimensions may depend on the particular dimensions of the components to be disposed in cavity 168. In accordance with an embodiment, the endwall 160 is formed integrally with the sidewall 158 so that the cap 150 is a single component. In other embodiments, the endwall 160 may be a separate component, and the cap 150 may be made up of multiple pieces.

The opening 162 may be formed in the endwall 160 and may be configured to allow the rod 152 to slidably move through the opening 162. In accordance with an embodiment, the opening 162 has a diameter that is greater than an outer diameter of the portion of the rod 152 adapted to slide through the opening 162. In an embodiment, the opening 162 diameter may be in a range of from about 1.5 cm to about 2.5 cm. In other embodiments, the diameter of the opening 162 may be greater or less than the aforementioned ranges. Although the opening 162 is shown as being formed substantially in the center of the endwall 160, the opening 162 may be formed in other locations of the endwall 160 in other embodiments. To guide the rod 152 through the opening 162, a bushing 170 may be secured within the opening 162. The bushing 170 allows the rod 152 to easily move axially within bushings 170 and 178, as will be described below. In another embodiment, the endwall 160 may include a subenclosure 172 formed therein and that may extend from the cavity 168. The subenclosure 172 may be configured to accommodate at least a portion of the switch assembly 156 and may be located between the opening 162 and the sidewall 158. In other embodiments, the subenclosure 172 may be located in another suitable portion of the endwall 160. In still another embodiment, the endwall 160 may be a flat disk-shaped plate and thus, may not form a enclosure.

The rod 152 extends at least the axial length of the cap 150 and includes a first end 174 and a second end 176. The rod 152 may comprise a material that is capable of maintaining structural integrity when subjected to temperatures in a range of from about −65° C. to about +200° C. For example, the rod 152 may comprise a metal or alloy or a ceramic material, including, but not limited to various stainless steels or aluminum alloys. The first end 174 of the rod 152 is adapted to be capable of moving through the second aperture 136 of the second end 134 of the housing 124 and thus, may have an outer diameter that is less than the diameter of the second aperture 136. For example, the diameter of the first end 174 of the rod 152 may be in a range of from about 1.0 cm to about 2.0 cm. In other embodiments, the diameter may be greater or less than the aforementioned ranges.

According to another embodiment, to guide the rod 152 through the second aperture 136, a boss 178 may be secured within the second aperture 136. The bushing 178 may comprise or may be coated with a material that is similar to that employed for bushing 170, in an embodiment. In other embodiments, the bushings 170, 178 may comprise different materials. Although the first end 174 of the rod 152 is shown as being dimensioned such that it is capable of sliding through the second aperture 136, in other embodiments, the first end 174 may be configured to have a largest outer diameter that is greater than that of the second aperture 136 so that the first end 174 of the rod 152 may be maintained at least partially in position within the enclosure 125 of the housing 124.

The second end 176 of the rod 152 is adapted to fix the actuator assembly 116 to the fixed location 118 (FIG. 1). According to an embodiment, the second end 176 may be configured to reside outside of the cap 150 and to attach to the fixed location 118 (FIGS. 1, 4, and 5). In accordance with an embodiment, the second end 176 of the rod 152 may be bolted, screwed, pinned, or otherwise attached to the fixed location 118. In some embodiments, the second end 176 of the rod 152 may be rotably attached to the fixed location. In an embodiment, the second end 176 of the rod 152 may be configured to have a largest outer diameter that is greater than that of the opening 162 so that the rod 152 may be maintained at least partially in position outside of the actuator mounting assembly 122. For example, the second end 176 of the rod 152 may include a ball, a clevis, a spherical rod bearing, a threaded rod, a bushing, a hook, or another type of security device in some embodiments. In another embodiment, the second end 176 of the rod 152 may be configured to have a largest outer diameter that is smaller than that of the opening 162. In still other embodiments, the second end 176 of the rod 152 may not have an enlarged or reduced size. In any case, attaching the second end 176 of the rod 152 to the fixed location 118 allows the housing 124 and the cap 150 to move together as a single unit causing the rod 152 to slide through the second aperture 136 and the opening 162 to adjust the rod's 152 position relative to the housing 124.

To allow the actuator mounting assembly 122 to respond to movement of the housing 124 relative the rod 152, the spring mechanism 154 is disposed in the cavity 168 between the housing 124 and the cap 150. The spring mechanism 154 is adapted to transmit a portion of an axial load received from the actuator 120 (FIG. 1) to the rod 152. As used herein, the term "axial load" may be identified as a magnitude of force that is to be employed to allow the actuator 120 to move the door 102 to the second, closed position. According to an embodiment, the spring mechanism 154 is a compression spring, which is selected to have a predetermined preload that is greater than the axial load that is to be employed to allow the actuator 120 to move the door 102 to the second, closed position. As used herein, the phrase "predetermined preload" may be defined as an amount of force that may be supplied against the spring mechanism 154 to compress the spring mechanism 154. In an embodiment, the spring mechanism 154 may comprise a spiral spring, an elastomeric material, a wave washer, a Bellevue washer, a pneumatic cylinder or another device capable of being preloaded to a predetermined magnitude of force.

In accordance with an embodiment, to transmit a portion of the axial load to the rod 152, the spring mechanism 154 may either contact or be attached to the rod 152. In one embodiment, the spring mechanism 154 may rest against a plate 180 that extends radially outwardly from the rod 152 and which is dimensioned to supply a surface against which the spring mechanism 154 can exert force. In an embodiment, the plate 180 may have an outer diameter that is greater than an outer diameter of the spring mechanism 154. In another embodiment, the outer diameter of the plate 180 may be in a range of from about 3.0 cm to about 8.0 cm, and the outer diameter of the spring mechanism 154 may be in a range of from about 2.5 cm to about 7.5 cm. In other embodiments, the diameters may be greater or less than the aforementioned ranges. In these embodiments, the spring mechanism 154 may be simply disposed between the plate 180 and the housing 124 without being attached to either component. In another example, the spring mechanism 154 may be coupled at one end to the rod 152. For instance, the spring mechanism 154 may be a Bellevue, or wave washer, and an end of the Bellevue washer may be attached to an outer surface of the rod 152.

Figure 3:
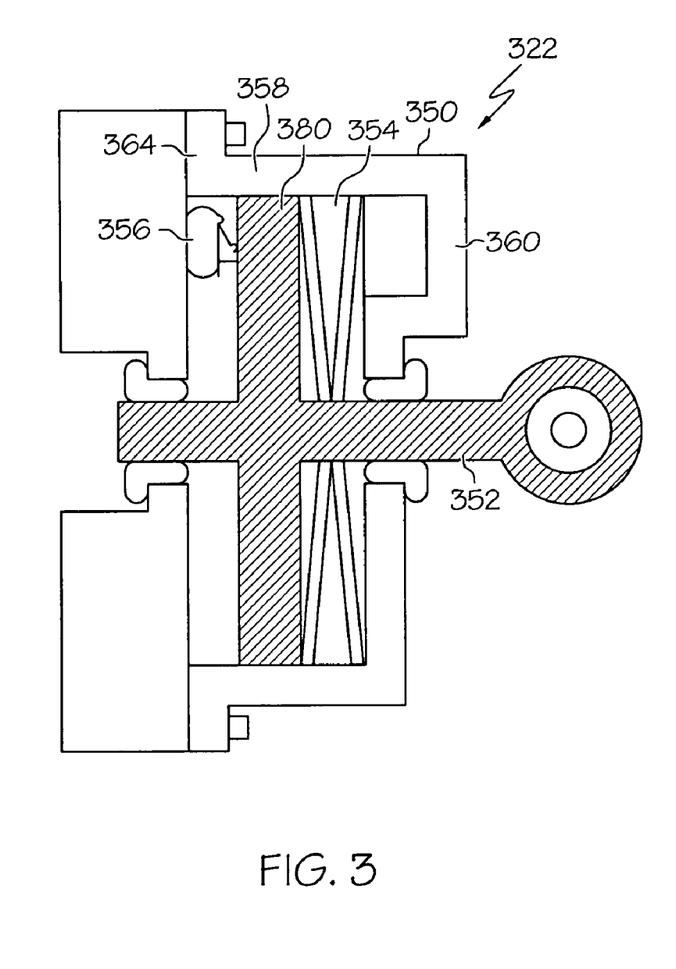
FIG. 3 is a simplified, cross-sectional view of an actuator mounting assembly and a portion of an actuator, according to another embodiment.

According to an embodiment in which the rod 152 includes a plate (e.g., plate 180), the spring mechanism 154 may be located between the housing 124 and the plate 180, as shown in FIG. 2. FIG. 3 is a simplified, cross-sectional view of an actuator mounting assembly 322, according to another embodiment. Here, the actuator mounting assembly 322 is configured substantially similarly to the actuator mounting assembly 122 of FIGS. 1, 2, 4, and 5, except that a spring mechanism 354 is disposed between a plate 380 (extending radially outwardly from a rod 352) and an endwall 360 of a cap 350 of the actuator mounting assembly 322. In another embodiment, a switch assembly 356 may be disposed between the plate 380 and an end 364 of a sidewall 358 of the cap 350. With reference to both FIGS. 2 and 3, in other embodiments in which a spring mechanism is attached to the rod 152, 352 the spring mechanism 154, 354 may extend from the rod 152, 352 to the housing 124, 324 or from the rod 152, 352 to the endwall 160, 360. In accordance with another embodiment, the spring mechanism 154, 354 may surround the rod 152, 352 so that the rod 152, 352 may extend and move axially through a center of the spring mechanism.

Returning to FIG. 2, in an embodiment, the switch assembly 156 may be disposed between the housing 124 and the cap 150 and may be adapted to sense relative positioning between the rod 152 and the cap 150 and to provide signals, based, in part, on the sensed relative positioning between the rod 152 and the cap 150. In an embodiment, the switch assembly 156 may include a sensor component 182 that is disposed in the cavity 168 and that is adapted to sense a position of the rod 152 relative to the cap 150 (the "relative position" of rod 152). The sensor component 182 may sense relative positioning either through direct contact with the rod 152 and/or a surface of the cap 150 or by indirect (i.e., hall-effect, magnetic, magneto-resistive, force/load cell, strain gauge, etc.) means. For example, in an embodiment in which the sensor component 182 senses relative position through direct contact, the sensor component 182 senses the first position of the rod 152 as being a first relative position when the sensor component 182 has a surface that is in contact with the rod 152. In an embodiment, the sensor component 182 may include an electrical component that has a completed circuit when a portion of the sensor component 182 is in contact with the rod 152. In another example in which the sensor component 182 senses the relative position of the rod 152 through direct contact, the sensor component 182 may be disposed on the rod 152 and may have a surface oriented to contact the cap 150 when the rod 152 has a particular relative position with respect to the cap 150. In an embodiment, the sensor component 182 may include an electrical component that has a completed circuit when a portion of the sensor 182 is in contact with the rod 152 or the cap 150. In another embodiment in which the sensor component 182 senses the relative position of the rod 152 by indirect contact, the sensor component 182 may include a device that detects a distance between the rod 152 and the cap 150.

The switch assembly 156 may include a single component or multiple components. One or more of the components of the switch assembly 156 may be mounted to the cap 150, in an embodiment. In some embodiments, one or more of the components of the switch assembly 156 may be mounted to the endwall 160, and/or may be disposed in the subenclosure 172 of the endwall 160. In another embodiment, one or more of the components of the switch assembly 156 may be mounted to the sidewall 158. According to an embodiment, a first relative position may be a position in which portions of the components of the switch assembly 156 and the rod 152 and/or cap 150 are in contact with each other. According to another embodiment, the first relative position may be a position in which portions of the components of the switch assembly 156 and the rod 152 and/or cap 150 are disposed at predetermined positions or distances relative to each other. According to still another embodiment, the first relative position may be a position in which the portions of the component of the switch assembly 156 and the rod 152 and/or cap 150 are disposed within a predetermined range of distances relative to each other. In any case, when the rod 152 moves from the first relative position to another, second relative position relative to the cap 150, the switch assembly 156 may be adapted to provide a signal to a controller (e.g., controller 128 of FIG. 1), such as an electrical, mechanical, pneumatic, or other type of signal to indicate that the rod 152 and/or the cap 150 has/have changed relative positions or no longer are in the first relative position. In an embodiment, the second relative position may be any position that is not the first relative position. For example, the second relative position may be a position in which the switch assembly 156 and the rod 152 are not in contact with each other or where a distance between the switch assembly 156 and the rod 152 is greater or less than the predetermined range of distances.

In another embodiment, the switch assembly 156 may include a first component 184 (shown in phantom) that is attached to the cap 150 and a second component 186 (shown in phantom) that is attached to the rod 152. The first component 184 may be disposed on an inner surface of the cap 150, such as on the endwall 160, in an embodiment, or on the sidewall 158, in another embodiment. In an embodiment, the first and second components 184, 186 may not be sensors, but may indicate positioning when moved from being in direct contact with each other in the first relative position and not being in direct contact with each other in the second relative position. Alternatively, the components 184, 186 may be disposed within a predetermined range of distances of each other while in the first relative position and outside of the predetermined range of distances while in the second relative position. In yet another embodiment, the switch assembly 156 may not include a sensor and instead, may comprise a motor controller, where the actuator drive component 148 comprises a stepper motor.

With reference now to FIG. 1, during operation of the door 102 of the aircraft 100, the door 102 may be in the first, open position. When in the first, open position, the lengthening mechanism 126 has a first end 130 that is attached to the door 102, and the lengthening mechanism 126 is disposed in a first length configuration. The rod 152 is coupled to the fixed location 118 and extends at least partially through the cap 150 of the actuator mounting assembly 122. The spring mechanism 154 is disposed between the cap 150 and the housing 124 of the actuator 120 and may have a predetermined preload. In some embodiments, the spring mechanism 154 may or may not be compressed to provide the predetermined preload. The controller 128 of the actuator assembly 116 provides commands to the actuator 120 to extend the lengthening mechanism 126 from the first length configuration to another length configuration to thereby move the door 102 out of the first position and into another position. As the lengthening mechanism 126 extends, the door 102 pivots around its first edge 108 causing the second edge 110 to rotate towards the aircraft wall 106.

Turning to FIG. 4, when the door 102 and/or the latch 112 contacts the aircraft wall 106, the lengthening mechanism 126 continues toward a desired length configuration, and an axial load is applied against the aircraft wall 106. As the axial load continues to be supplied by the lengthening mechanism 126, the housing 124 and the cap 150 are pushed away from the door 102 and toward the fixed location 1 18. When the switch assembly 156 senses that the rod 152 and the cap 150 are in a first relative position with respect to each other and when the axial load is less than the predetermined preload of the spring mechanism 154, the switch assembly 156 provides a first signal to the controller 128. In response, the controller 128 provides (or continues to provide) a first command to the actuator drive motor 148 to cause the lengthening mechanism 126 to continue to extend. As a result, the cap 150 is allowed to move axially relative to the rod 152.

When the axial load exceeds the predetermined load of the spring mechanism 154, the spring mechanism compresses, as shown in FIG. 5. In particular, the housing 124 applies a force against the spring mechanism 154 to compress the spring mechanism 154. As a result, the housing 124 moves relative to the rod 152, allowing the rod 152 to move through the second aperture 136 of the housing 124 and to change to a second relative position with respect to the housing 124.

Because the cap 134 is fixed to the housing 124, the cap 134 also moves relative to the rod 152, which consequently causes the switch assembly 156 to sense the changed positioning of the housing 124 relative to the rod 152. For example, in an embodiment, the switch assembly 156 detaches from a surface of the rod 152, as shown in FIG. 5, indicating that the rod 152 and the housing 124 are in the second relative position. In such case, the switch assembly 156 then provides a second signal to the controller 128. In response, the controller 128 provides a command to the actuator drive motor 148 to discontinue extension of the lengthening mechanism 126. Alternatively, the controller 128 may discontinue providing the first command (e.g., the command that caused the actuator drive motor 148 to cause the lengthening mechanism 126 to extend), and that discontinuance may cause the actuator drive motor 148 to cease extension of the lengthening mechanism 126. Accordingly, the cap 150 is prevented from moving axially relative to the rod 152, and the spring mechanism 156 continues to exert a force against the housing 124 and hence, the door 102, to maintain the door 102 in the second, closed position.

As noted above, the actuator 120 may be implemented with a position sensing device (such as an RVDT or LVDT) 129, in some embodiments, which may be used to continuously monitor positioning of the lengthening mechanism 126 over time. For example, a newly installed position sensing device may be set at an initial positioning. However, over time, one or more components of the actuator 120 may become worn, which may adjust positioning of the position sensing device and the compression of the spring mechanism 154 to an undesired positioning. However, the actuator mounting assembly 122 detects the adjusted positioning to thereby allow re-adjustment of the lengthening mechanism 126.

The above-described mounting assembly 122 may be employed in any one of numerous vehicles and/or assemblies in which an actuator may be used. The actuator mounting assembly 122 may be implemented with components to be actuated having a wide variety of sizes, and thus axial loads. In particular, by selecting spring mechanisms having preloads that exceed the particular axial loads needed to actuate the components, the actuator mounting assembly 122 may be "customized" for the particular component. Additionally, because the preload of the spring mechanism exceeds the axial loads needed to actuate the component, the spring mechanism continuously supplies a load against the actuator 120 and adjusts to thereby compensate for mechanical tolerances that may be present in the dimensions of the door 102, the opening 104, the lengthening mechanism 126, the actuator 120, and/or other components of the actuator assembly 116.

An assembly has now been provided that improves the manner by which a door, or other component to be actuated, is installed in a vehicle, such as an aircraft. The assembly may include fewer rigging components than conventional actuator mounting assemblies and may be simpler to install. In addition, the improved mounting assembly may allow an actuator to be installed onto more than one type of vehicle model without adjustment of the mounting assembly and/or actuator post-installation.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An actuator assembly, comprising:
    an actuator including:
        a housing having an end and an aperture formed through the end, and
        a lengthening mechanism extending through the housing, the lengthening mechanism configured to extend or shorten;
    a controller in communication with the actuator and adapted to provide commands to the actuator to extend or to shorten the lengthening mechanism; and
    an actuator mounting assembly coupled to the actuator, the actuator mounting assembly including:
        a cap including a sidewall, an endwall, and an opening, the sidewall coupled to the end of the housing, the sidewall and the endwall defining a cavity, and the opening formed through the endwall,
        a rod extending through the cap and including a first end and a second end, the first end extending through the aperture in the housing and movable relative to the housing and the lengthening mechanism, the second end adapted to attach to a fixed location,
        a spring mechanism disposed between the housing and the cap and having a predetermined preload, and
        a switch assembly disposed between the housing and the cap, the switch assembly adapted to sense relative positioning between the rod and the cap and to provide a first signal and a second signal to the controller, based, in part, on the sensed relative positioning between the rod and the cap, wherein:
            when the switch assembly senses that the rod and the cap are in a first relative position with respect to each other in which the axial load is less than the predetermined preload of the spring mechanism, the switch assembly provides the first signal to the controller, and the controller provides a first command to the actuator to allow the lengthening mechanism to extend to thereby allow the cap to move axially relative to the rod, and
            when the switch assembly senses that the rod and the cap are in a second relative position with respect to each other in which the axial load is greater than the predetermined preload of the spring mechanism, the switch assembly provides the second signal to the controller, and the controller provides a second command to the actuator to discontinue extension of the lengthening mechanism to prevent the cap from moving axially relative to the rod.

2. The actuator assembly of claim 1, further comprising:
    a plate extending radially from the rod and disposed within the cavity of the cap.

3. The actuator assembly of claim 2, wherein:
    the spring mechanism is disposed between the plate and the end of the sidewall of the cap; and
    the switch assembly is disposed between the plate and the endwall of the cap.

4. The actuator assembly of claim 2, wherein:
    the spring mechanism is disposed between the plate and the endwall of the cap; and
    the switch assembly is disposed between the plate and the end of the sidewall of the cap.

5. The actuator assembly of claim 1, wherein the lengthening mechanism has a first end and a second end, the first end of the lengthening mechanism is adapted to be coupled to a door, and the second end is disposed in the housing.

6. The actuator assembly of claim 1, wherein the actuator further comprises an actuator drive motor coupled to the lengthening mechanism and in communication with the controller, the actuator drive motor configured to receive commands from the controller and to actuate the lengthening mechanism to thereby cause the lengthening mechanism to extend or to shorten, based on the commands received from the controller.

7. The actuator assembly of claim 5, wherein the actuator further comprises a position sensing device in communication with the lengthening mechanism and the controller, the positioning sensing device adapted to sense positioning of the lengthening mechanism and to provide a signal to the controller, when a position of the lengthening mechanism moves from a first length configuration to a second length configuration.

8. The actuator assembly of claim 1, wherein:
    the switch assembly comprises a sensor component adapted to sense the relative positioning between the rod and the cap and to send the first signal or the second signal to the controller.

9. The actuator assembly of claim 8, wherein the sensor component is disposed on the cap.

10. The actuator assembly of claim 8, wherein the sensor component is disposed on the rod.

* * * * *